United States Patent [19]

Szabo

[11] 3,896,420

[45] July 22, 1975

[54] FREQUENCY SELECTIVE OPTICAL MEMORY

[75] Inventor: Alexander Szabo, Ottawa, Canada

[73] Assignee: Canadian Patents and Development Limited, Ottawa, Canada

[22] Filed: Jan. 14, 1972

[21] Appl. No.: 217,893

[52] U.S. Cl. .................... 340/173 CC; 340/173 LT

[51] Int. Cl.[2] ........................................ G11C 13/04

[58] Field of Search...340/173 LT, 173 LM, 173 LS, 340/173 CC

[56] References Cited

UNITED STATES PATENTS

| | | | |
|---|---|---|---|
| 2,761,846 | 9/1956 | Medved | 340/173 CC |
| 3,123,711 | 3/1964 | Fajans | 340/173 CC |
| 3,253,497 | 5/1966 | Dreyer | 340/173 CC |
| 3,447,138 | 5/1969 | Carson et al. | 340/173 CC |
| 3,466,616 | 9/1969 | Bron et al. | 340/173 CC |
| 3,474,248 | 10/1969 | Brown | 340/173 CC |
| 3,508,208 | 4/1970 | Duguay | 340/173 CC |
| 3,568,167 | 3/1971 | Carson | 340/173 CC |
| 3,580,688 | 5/1971 | Schneider | 340/173 CC |
| 3,609,707 | 9/1971 | Lewis | 340/173 CC |
| 3,654,626 | 4/1972 | Geller | 340/173 CC |

OTHER PUBLICATIONS

Szabo, Laser-Induced Fluorescence-Line Narrowing in Ruby, 10/5/70, Physical Review Letters, Vol. 25, No. 14, pp. 924–926

Feofilov, Phototransfer of an Electron in $MeF_2$-Eu, Sm Monocrystals, 10/61, Optics and Spectroscopy, Vol. XII, pp. 296–297.

Bosomworth, Thick Holograms in Photochromatic Materials, 1/68, Applied Optics, Vol. 7, No. 1, pp. 95–98.

Geller, Two-Photon Absorption in Alkali Halides with a Pulsed $H_2$ Laser, 10/67, Applied Physics Letters, Vol. 11, No. 7.

*Primary Examiner*—Stuart N. Hecker
*Attorney, Agent, or Firm*—James R. Hughes

[57] ABSTRACT

A frequency selective optical memory device formed of a material that exhibits inhomogeneous line broadening and whose elemental regions on scanning by an intense light (laser) beam will become saturated only at a homogeneous linewidth related to the frequency of the applied laser pulse in the overall inhomogeneous line bandwidth. Each elemental region can be scanned in frequency and this gives the memory device a third dimension as far as data storage is concerned greatly increasing its storage capacity.

3 Claims, 6 Drawing Figures

FREQUENCY SELECTIVE OPTICAL MEMORY

This invention relates to a frequency selective optical memory and more particularly to a method and apparatus for storing the processing digital or analogue data using a frequency selective absorption phenomenon.

Two standard means of storing data are punched paper tape and magnetic tape. In each case the data is stored on a two dimensional surface. Once information has been written onto a surface then, of course, no further data can be written in the same area. It would be highly desirable if there were means for storing data many times in the same area or in other words adding a third dimension to the storage capacity of a data storage element.

The idea of the use of optical saturation phenomena for computer applications is not new and has previously been proposed and described, e.g., "Progess in Optical Computer Research" by O. A. Reimann and W. E. Kosonochy, IEEE Sept. 2, 181 (1965). The present invention is concerned with optical saturation of a storage memory element but involves a frequency selective feature that will add greatly to the storage capacity of an optical memory element in which each elemental area of the memory can be written on many times. In theory the principle would allow each area to be written on approximately $10^7$ times over. This, however, is a theoretical limit and in practice even if a much smaller number, say 100, could be achieved this would be a tremendous advantage in storage capacity of a memory element.

The following is a résumé of how optical saturation works. Consider a pulse of laser light passing through a slab of material which has an optical transition corresponding to the laser frequency $f$. At low light levels, the number of photons transmitted ($N_t$) is given by the classic equation:

$$N_t = N_o \exp - \sigma(n_l - n_u)l \qquad (1)$$

where $\sigma$ is the absorption cross-section, $n_l$ is the atom density in the lower energy level and $n_u$ is the density in the upper level and $l$ is the slab thickness. At low light levels $n_u \simeq 0$ and $n_l \equiv n$ the total density of absorbing atoms in the crystal. Therefore the ratio of transmitted to incident light intensity is just $\exp - \sigma n_l$. For example in a ruby crystal ($Al_2O_3$ in which 0.05% of the Al atoms are replaced by chromium) $n = 10^{19}$Cr atom/cc, $\sigma = 1.5 \times 10^{-18}cm^2$. Therefore a 1 mm. thick slab will absorb about 80% of the incident light. If the crystal is saturated by a high intensity light pulse, we get $n_u = n_l = n/2$ with the populations being equalized (since the probability of absorption of a photon by an atom initially in the lower state is equal to the probability of stimulated emission to the lower state by an atom initially in the ground state, the limiting value for the populations under intense excitation is for $n_u = n_l$. From equation (1) we see that after saturation, the crystal is transparent and, therefore, acts like a hole in punched paper tape. The crystal recovers at a rate corresponding to the upper state lifetime and hence the hole must be rewritten into the crystal once every lifetime if it is to be used as a memory element. In ruby this would be approximately every 10 milliseconds.

In the known scheme of using saturation phenomena for memory application, no mention has been made of the laser frequency except that it be equal to the absorption frequency. Absorption lines have a finite width for various reasons and if a line is saturated at one frequency the question arises of what happens to the absorption line at a slightly different frequency. The answer depends on the type of line broadening whether it is homogeneous or inhomogeneous. For a homogeneous line, if saturated at any point in the line, then the whole line saturates which means that the crystal becomes transparent at all frequencies lying within the absorption line. An inhomogeneous line, by definition is one which is made up of homogeneous lines each of which has a slightly different resonant frequency. For example, atoms in gases exhibit an inhomogeneous broadening because of the Doppler effect. The gas methane has an optical transition which has a homogeneous width of approximately 1 KHz which would not appear if the gas atom did not move but which is broadened to approximately 100 MHz because of motions of the gas atoms due to thermal effects. Thus the inhomogeneous line shape is a composite of much narrower homogeneous lines. Another example of an inhomogeneous line is that the so-called $R_1$ optical transition (at approximately 7000 A in ruby at low temperatures). In this case, the phenomena responsible for the distribution of resonant frequencies are various kinds of imperfections in the crystal. These imperfections cause a variation of the crystal field seen by chromium (Cr) ions and, therefore, a variation of the Cr ion energy level separation which is determined by a crystal field Stark effect.

If an inhomogeneous line is saturated at one frequency, the whole inhomogeneously broadened line does not become transparent but only the local homogeneous width at the excitation frequency in question. This results in a notch of "hole" in the overall inhomogeneous bandwidth curve. This frequency selective saturation phenomenon is well known in microwave spectroscopy and is referred to as "hole-burning." The phenomenon of "hole burning" at optical frequencies in solids (ruby) has been observed by the applicant and is described in a paper entitled "Laser-Induced Fluorescence-Line Narrowing in Riby," A. Szabo, *Physical Review Letters* Vol. 25, No. 14, Oct. 5, 1970, and a paper entitled "Observation of the Optical Analog of the Mössbauer Effect in Ruby," A. Szabo, *Phys. Rev. Letters* 27, 323, Aug. 9, 1971.

It is an object of the present invention to employ the "hole-burning" phenomenon in relation to inhomogeneously broadened spectral lines in crystal materials to provide an optical memory element that is frequency selective.

It is another object of the invention to provide a memory element for computer data storage that has a much increased storage capacity in relation to its area.

These and other objects of the invention are achieved by a frequency selective optical memory device of a material exhibiting inhomogeneous line broadening and whose elemental regions on scanning by intense light (laser) beam will become saturated only at a homogeneous linewidth related to the frequency of the applied light pulse in the overall inhomogeneous line bandwidth.

In drawings which illustrate embodiments of the invention,

Figure 4:
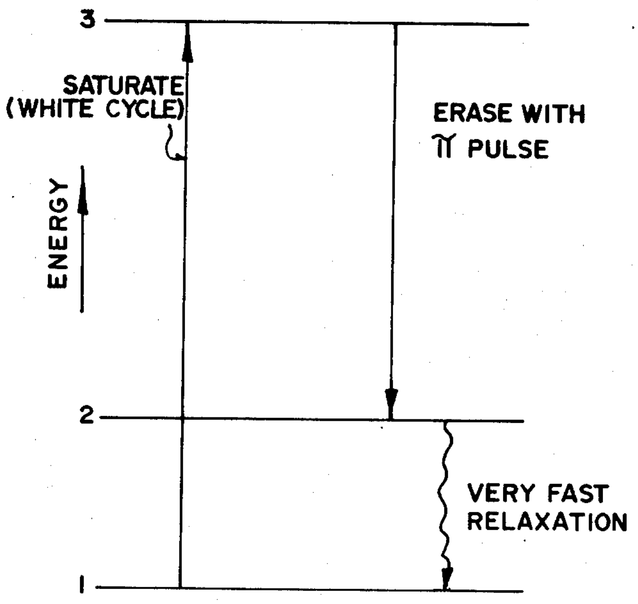
Figure 6:
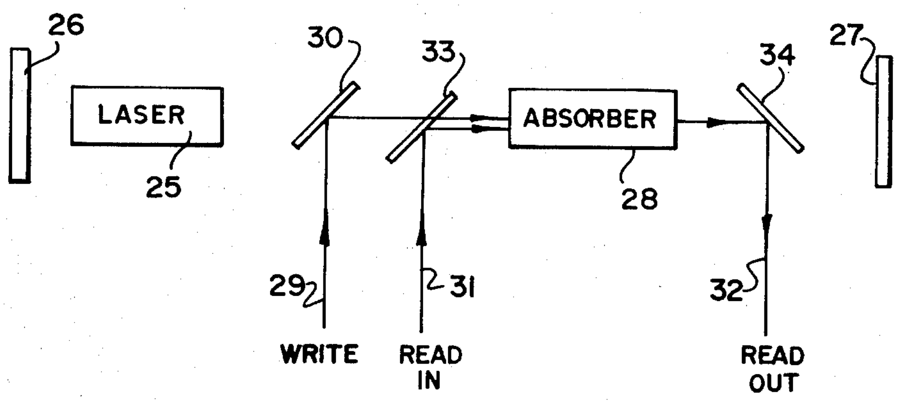
Figure 5:
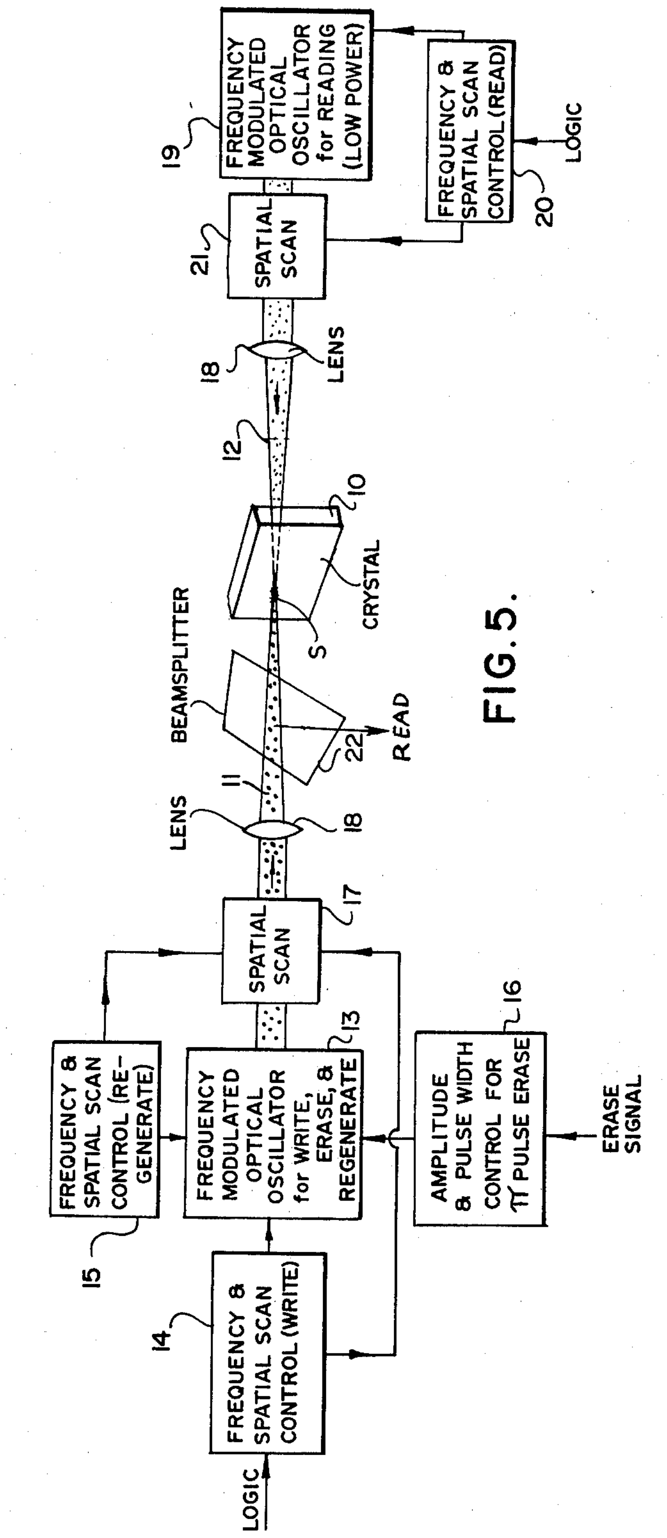

FIG. 4 is a plot of three level zero-phonon system and means for coherent de-excitation for fast erasure, FIG. 5 is a block diagram of a read-write circuit for writing, regenerating, and erasing data in a memory element according to the invention, and FIG. 6 shows an arrangement where the memory element becomes an absorber in a broad band laser that continuously floods the memory element with light maintaining the data condition in it.

Figure 1:
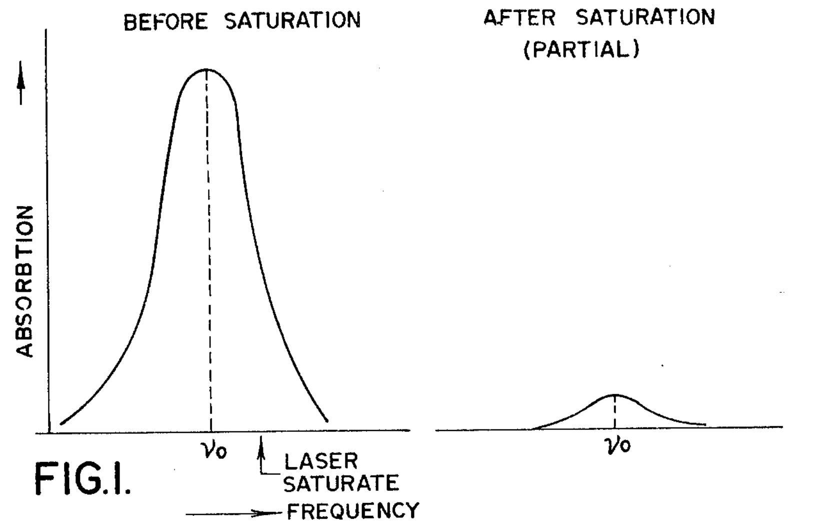
FIG. 1 is an illustration of homogeneous line saturation.
Figure 2:
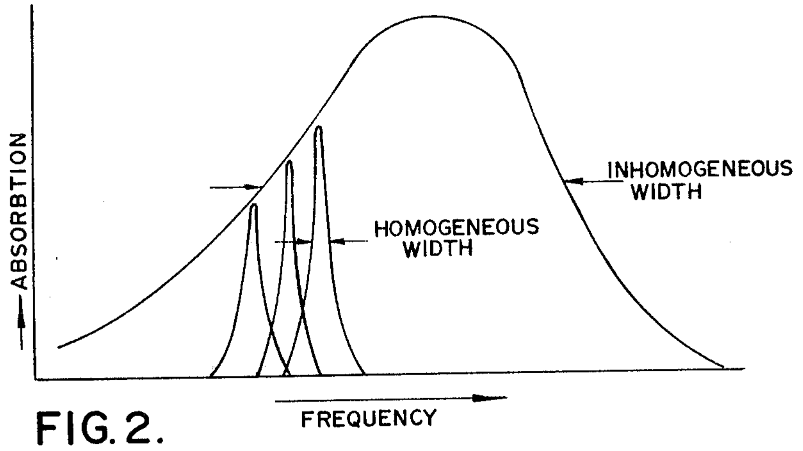
FIG. 2 illustrates an inhomogeneous absorption line showing how it is made up of a sum of homogeneous lines with a range of frequencies.
Figure 3:
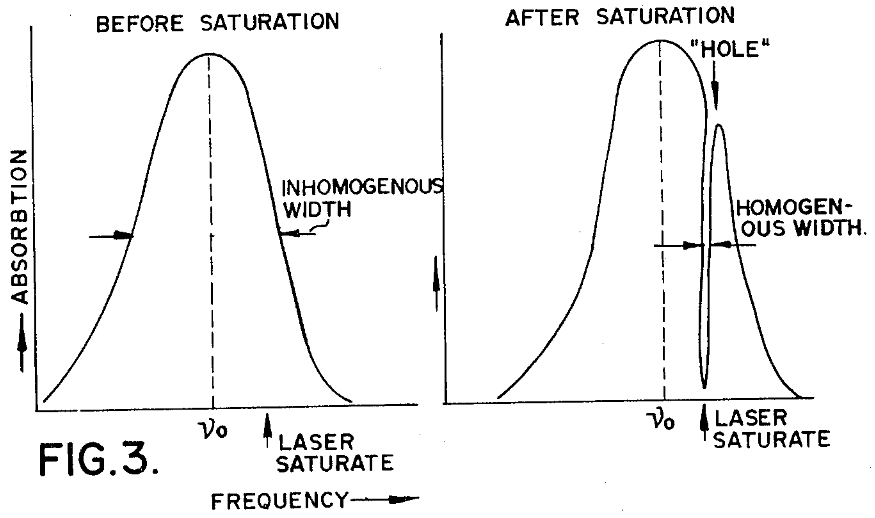
FIG. 3 shows saturation behvaior of an inhomogeneous line illustrating the term "hole-burning,"

Referring to FIG. 1 is a graph illustrating how a homogeneous line in a crystal saturates when exposed to a high energy light pulse. It will be seen that the complete curve over the whole bandwidth is reduced towards zero. FIG. 2 illustrates how an inhomogeneous absorption line in a crystal is made up of a sum of homogeneous lines spread over a range of frequencies and FIG. 3 shows the behavior of an inhomogeneous line in a crystal on saturation by a high energy light pulse. In the latter case the whole curve does not collapse towards zero but only the local homogeneous width of the frequency of the applied light pulse is removed leaving a "hole" or gap. It is this phenomenon that is used in the present invention to make the crystal frequency sensitive at any one elemental part or region. It will be realized that there will exist a series of homogeneous widths across the inhomogeneous bandwidth each at a discrete frequency. If the crystal memory element has laser light pulses of a series of appropriate frequency levels directed on its surface, then each elemental area will have the capacity of storing data not only once but for each frequency.

The theoretical number of bits of information which could be stored in a crystal slab $1 \times 1$ cm$^2$ by 1 mm. thick is about $10^{15}$ which may be compared to the memory capability of a standard computer which is typically $10^6$ bits in core memories (fast access), $10^9$ bits on magnetic disc (medium access) and about $10^{10}$ bits on magnetic tape (slow access time). The present crystal memory if "fast access" since its operation is not limited to the necessity of serial playback which is inherent in magnetic disc and tape memory systems.

The number of resolvable spots of light which can be focussed on a $1 \times 1$ cm$^2$ "page" is determined by diffraction to dimensions of about the wavelength of light. For visible light this amounts to a spot or elemental region size of about $10^{-4}$ cm. This gives approximately $10^8$ resolvable spots on a page. With the present invention each spot can be further subdivided by frequency. A typical inhomogeneous linewidth in a solid is $10^{10}$Hz which may be saturated in widths of $10^3$Hz. Thus each spot has $10^7$ resolvable elements in frequency space giving a total number of bits $= 10^8 \times 10^7 = 10^{15}$. Even if only a portion of this $10^7$ multiplying factor (third dimension) could be effectively used then the capacity of crystal memory element can be very greatly increased.

The number of memory elements is determined by the reading and writing speed required. To saturate the sample in a frequency width or step of 1KHz, the saturating light pulse cannot be shorter than the inverse of this frequency, i.e., approximately $10^{-3}$ sec. as determined by the Fourier spectrum of the pulse. The shorter the pulse, the broader is the bandwidth of the light radiation making up the pulse and therefore a direct tradeoff may be made between speed and memory capacity. The memory described is self-adaptive and no change in the crystal is required to change between fast and slow operation.

Because of the excited-state decay, information written into the crystal will only last for the lifetime, about $10^{-2}$ seconds. Therefore a saturated bit must be regenerated every $10^{-2}$ seconds. To regenerate a $10^{15}$ element memory in $10^{-2}$ seconds allows $10^{-17}$ seconds for each element assuming serial regeneration. To scan the beam in this order of time would make its bandwidth much greater and an element would no longer be $10^3$Hz wide when it is realized that deflecting a light beam will increase its frequency spread. In addition to frequency modulate quickly (i.e., to scan in the frequency dimension) will produce undesirable sidebands which could introduce cross-talk between elements. It might appear that serial regeneration (as well as reading and counting) is not possible for a memory of this size and that parallel operation will be required, e.g., have a fixed separate laser beam for each spot (element) on the crystal and then step its frequency to scan in the frequency dimension. However, lasers that are tunable are now available and may be used. For example a paper in *Applied Physics Letters* on Sept. 15, 1970, by H. Walther and J. C. Hall describes a tunable dye laser with narrow spectral output and a note in *Physics Today* for January 1970 describes a continuous dye laser that will yeild a tunable output.

Referring to FIG. 4 a three level energy plot shows how fast erasure may be achieved. Under certain conditions a light pulse interacting with a two level system can produce effects quite different from the saturation effect described above. Coherence effects can be used to provide rapid erasure of information written into the memory. As stated above the only way to erase the memory would seem to be to wait for excitation to decay and this time is given by the lifetime which is in the order of milliseconds. However, by making the light pulse sufficiently short and strong the population in level 3 (in FIG. 4) can be completely transferred to level 2 by what is known as a $\pi$ pulse. From level 2 fast relaxation occurs to level 1. For fast erasure a 3-level system is needed. Such multiline systems are known with fast relaxation between levels 1 and 2. In order to erase the crystal in a time $t$, a peak power is given by the equation:

$$\sqrt{P}\, t = \text{constant}$$

where $P$ is power density. Thus to erase quickly more power is required than for slow erase. It should be noted that a fast erase means a larger pulse bandwidth and hence a decrease in the number of memory elements.

FIG. 5 shows a complete system for regenerating, reading, and writing on a crystal optical memory. A memory element 10 which is a crystal maintained at a low temperature (liquid helium) and made of a material that exhibits inhomogeneous line broadening is positioned to be scanned by laser beams 11 and 12. Suitable kinds of material having the necessary characteristics will be discussed below. Laser beam 11 which is for purposes of writing, erasing, and regenerating the data in the crystal in for example elemental area or spot $S$ on crystal 10 is generated by frequency modulated optical oscillator 13 which is controlled by spatial scan control 14 for writing purposes, frequency and spatial scan control 15 for purposes of regenerating the data, and amplitude and pulse-width control 16 for purposes of erase ($\pi$ pulse erase). Suitable logic signal inputs originating from logic control centers, e.g., a computer, would control these various devices. These devices are conventional in design and could take many different forms depending, of course, on the environment in which the memory device is to be employed. A means for spatially scanning the beam 17 is provided to scan the beam over the working area of crystal 10 and a suitable focussing lens 18 would be necessary.

Laser beam 12 which if for the purpose of reading the stored data is generated by frequency modulated optical oscillator 19 controlled by frequency spatial scan control 20. A spatial scanning means 21 scans beam over the crystal working area. If the spot S for example is transparent the "read" beam will pass through. A partially transparent beam splitter 22 directs part of the light at right angles and this would go to the output detecting devices.

The type of materials that may be used for the memory element are as follows:

1. chromium (Cr) doped ruby ($Al_2O_3$)
2. chromium doped MgO
3. color centres in alkali halides — see paper "Zero-Phonon Transitions" by D. B. Fichten in *Physics of Colour Centres*, Academic Press, 1968, page 293 for a discussion of these.
4. Molecular ions in alkali halides specifically $O_2$, $S_2$, $Se_2$, SeS in KI.

Theoretical considerations as well as indirect experiments (photon echo studies) indicate that the narrowest line (homogeneous width) in ruby will be about 10MHz not $1KH_2$ as estimated earlier. This is caused by interaction of the Cr atom with nearby Al nuclear spins. The Al spins create a randomly fluctuating magnetic field at the Cr atom position which broadens the line because of Zeeman effect. The host lattice MgO has no nuclear spin and should, therefore, produce 1KHz lines. Cr:MgO is a possibility as a material for the memory element but it does not act as a laser. It may, however, be used in conjunction with a tunable laser that can be used to excite the transition. Tunable lasers have now become available.

Another possible material for use as a memory is a gaseous absorber e.g. methane, iodine, bromine which have optical absorber lines, however, their inhomogeneous widths are narrow and not expected to be as useful as solids. However, gases do have the advantage that liquid helium cooling is not necessary.

Present laser technology is not capable of processing the information in and out of the memory in large amounts and taking advantage of the very large memory storage capacity and capability of this type of memory element. There are, however, rudimentary devices available to provide all the necessary functions (frequency and spatial switching) and intensive studies are being made in the improvement of these devices.

As pointed out above the provision of parallel laser beams for each elemental area of the memory is out of the question and the scanning of a single beam at the speeds required presents large technical problems. However, a single beam can be split into a number of separate beams in space each of which could be separately modulated or a number of parallel beams could be used one for each subdivided area of the memory and scanned over this more limited area. This latter would reduce the problems involved in high speed scanning but would involve a fairly complex read, write, regenerate system.

The device can be operated as an absorber in a broad-band laser and this is shown schematically in FIG. 6. A laser 25 has end mirrors 26 and 27. A crystal 28 acting as an absorber for laser action is the memory element. The regions which have been rendered transparent by a writing beam would not permit laser action to commence. The written record would thus be maintained by a single broad-bank laser flooding the whole memory. The system is bistable. If laser action is not initially present then the absorber suppresses oscillation. If the absorber is saturated in one spot (by another write beam) this laser action will occur through this spot and will be maintained until the laser is turned off and the absorber recovers (or a $\pi$ pulse erases the spot). This system simplifies the problem of regeneration of the stored data but data read and write will have to be carried out. A separate write laser beam and a separate read laser beam will have to be introduced into the system. This can be done by incorporating the memory system of FIG. 6 into the overall system of FIG. 5 or by probe systems introduced into the FIG. 6 system from the side. A write beam 29 from a laser and a scanning device (not shown) is applied to the crystal 28 by a partially reflecting mirror 30 and a "read in" beam 31 and a "read out" beam 32 are applied to the crystal by beam splitter mirrors 33 and 34. These three laser beams are controlled by external circuitry (not shown) for purposes of scanning spatially and in frequency.

An important feature of the memory element herein described is that it is indefinitely stable against damage or chemical change. Another significant feature is that once a narrow hole is burnt into the line it does not broaden with time, in other words, there is no "spectral diffusion." If there were diffusion then, of course, the device would not work and be useless as a memory element (see reference given above, "Observation of the Optical Analog of the Mössbauer Effect in Ruby").

What is claimed is:

1. A data storage system comprising:

a. a broad band laser, b. an optical memory device in the form of a block of material exhibiting inhomogeneous absorption line broadening and which has a large number of regions that on application of an intense light beam becomes saturated only at a homogeneous line-width frequency related to the frequency of the applied light pulse in the overall inhomogeneous line band-width and which is positioned in the beam path of the broad-band laser such that a surface is being continuously flooded with the laser light, c. a first laser beam positioned to scan a surface of said block and "write" information in the block, and d. a second laser beam positioned to scan a surface of said block and "read" information from the block.

2. A data storage system as in claim 1 wherein the first and second laser beams are tunable to give a series of discrete frequency levels of operation.

3. A data storage system comprising:

a. a frequency selective optical memory device in the form of a block of material having a generally parallel front and rear surfaces, said material being a crystal of chromium doped with $Al_2O_3$ exhibiting inhomogeneous absorption line broadening and which has a large number of regions that on application of an intense light beam becomes saturated only at a homogeneous linewidth frequency related to the frequency of the applied light pulse in the overall inhomogeneous line bandwidth, b. a first laser beam positioned to scan the front surface of said block of material and "write" and "regenerate" information in the block, c. a second laser beam positioned to scan rear surface of said block and "read" information stored in the block, and d. timing and control means for said laser beams.

* * * * *